United States Patent [19]

Lang et al.

[11] 4,227,144

[45] Oct. 7, 1980

[54] ERROR COMPENSATION OF SYNCHRO CONTROL TRANSMITTERS

[75] Inventors: Charles W. Lang, Wayne; Thomas Beneventano, Washington Township, Burlington County, both of N.J.

[73] Assignee: The Singer Company, Little Falls, N.J.

[21] Appl. No.: 3,831

[22] Filed: Jan. 16, 1979

[51] Int. Cl.[3] .............. H02K 24/00

[52] U.S. Cl. .............. 323/121; 29/407; 29/593; 318/437

[58] Field of Search .............. 323/116–118, 323/121, 122; 318/437, 438; 29/407, 593

[56] References Cited

U.S. PATENT DOCUMENTS

| | | | |
|---|---|---|---|
| 2,609,435 | 9/1952 | Gerth | 318/437 X |
| 2,625,599 | 1/1953 | Downes | 318/437 X |
| 2,872,723 | 2/1959 | Levine et al. | 29/593 |

*Primary Examiner*—William H. Beha, Jr.

*Attorney, Agent, or Firm*—John C. Altmiller; Thomas W. Kennedy

[57] ABSTRACT

In order to correct errors in a synchro control transmitter, the error in the transmitter is measured at equal angular increments, the magnitude and phase of the maximum error of the second harmonic determined and resistors placed across two pairs of the three transmitter outputs selected such as to establish a second harmonic load unbalance which is approximately equal in magnitude and opposite in phase to the measured error.

8 Claims, 5 Drawing Figures

ERROR COMPENSATION OF SYNCHRO CONTROL TRANSMITTERS

BACKGROUND OF THE INVENTION

This invention relates to synchro control transmitters in general and more particularly to the compensation of errors in synchro control transmitters.

Synchro control transmitter manufacturing variations normally produce second harmonic (two-cycle) errors in space as a units rotor is turned through 360 degrees. This type of error is also caused by stresses induced in a unit's structure during platform assembly and by unbalanced impedance loading of the output windings. Error reduction has been accomplished by deliberately unbalancing synchro impedance loading in a trial and error fashion. This procedure has proven to be tedious and does not yield optimum results.

SUMMARY OF THE INVENTION

The object of the present invention is to develop improved method and apparatus for reducing synchro control transmitter errors.

A further object is to provide a synchro or synchro system which includes compensation according to the present invention.

In general terms, the method of the present invention comprises measuring the synchro error at equal angular increments; determining from the measurement the maximum synchro error and the phase angle of that synchro error and inserting compensation resistors such as to induce an unbalanced error which is equal in magnitude and opposite in phase to the measured error. In accordance with the illustrated embodiment, measurements are made at 30° increments and the maximum error and its phase angle determined by means of Fourier analysis. In order to determine the resistor values which are needed to achieve the necessary unbalance to compensate for this error an analytical expression was derived for synchro error induced by unbalancing of the load across the three phase synchro output. This equation is used to generate formulas for computation of compensation resistors which, when incorporated into a synchro load, nullify the two-cycle component of error.

In carrying out the present invention the quantity known as synchro constant also is measured and this constant used along with calculated relationships to determine the values of compensation resistors which are then placed across the synchro windings to carry out the necessary compensation.

In accomplishing compensation, in order to achieve the load unbalance, two resistors which are placed in parallel across the load and thus which are placed across two of the synchro output terminals are provided. Thus, the compensated synchro according to the present invention comprises a conventional synchro having three windings spaced 120° in its stator with a compensation resistor across two of its output terminals, commonly designated as S1, S2 and S3. Thus, for example, there will be compensation resistors across the terminals S1 and S3 and the terminals S3 and S2.

A number of synchros were compensated for error using the formulas which were developed. Maximum residual errors were reduced below 2 arc minutes from errors which ranged as high as 10 arc minutes.

DETAILED DESCRIPTION OF THE INVENTION

Figure 1:
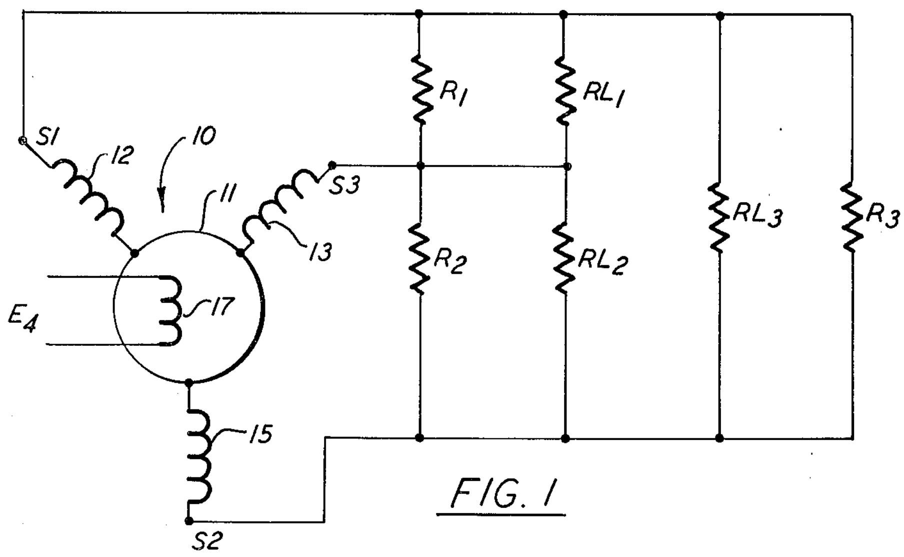
FIG. 1 is a schematic diagram of a synchro having coupled across its output a conventional bridge which loads the synchro, and which has in parallel therewith the trim resistors of the present invention.

FIG. 1 illustrates a typical synchro 10, having three stator windings, Y-connected and spaced apart by 120°. The stator windings 12, 13 and 15 are all tied together at the center and their free ends, which are the outputs of the synchro, are designated in conventional fashion S1, S2 and S3. The stator 11 also includes a rotor winding 17 across which there is an induced rotor voltage in normal circumstances. Connected across the terminals S1 and S3 is shown a load $R_L$1, across the terminals S3 and S2 a load $R_L$2 and across the terminals S1 and S2 a load $R_L$3. In operation, this will be the normal synchro load. For test purposes, a load is simulated by connecting the output terminals across a bridge in which case the load resistors $R_L$1, $R_L$2 and $R_L$3 are the bridge resistors. Also, shown in parallel with each of the load resistors is an additional resistor. These resistors, designated $R_1$, $R_2$ and $R_3$, respectively, are the compensation resistors and in the compensated synchro, as will be seen below, only two of these resistors are present. All three resistors are shown since in order to develop an equation it is necessary to consider all three. Considering all three compensation resistors in the circuit, the following expression can be developed.

$$\delta = \left[ \left( \frac{R_1 R_2 + R_1 R_3 - 2R_2 R_3}{R_1 R_2 R_3} \right) \text{SIN}2\theta - \sqrt{3} \left( \frac{R_2 - R_3}{R_2 R_3} \right) \text{COS}2\theta \right] \quad (1)$$

Which can also be expressed as:

$$\delta = E_c \,\text{SIN}\,(2\,\theta + \beta_c) \quad (2)$$

$$E_c = \frac{Z}{2} \sqrt{\left( \frac{R_1R_2 + R_1R_3 - 2R_1R_3}{R_1R_2R_3} \right)^2 + 3\left( \frac{R_2 - R_3}{R_2 R_3} \right)^2} \quad (3)$$

$$\beta_c = \text{Tan}^{-1} \left[ \frac{\sqrt{3}\, R_1(R_2 - R_3)}{R_1R_2 + R_1R_3 - 2R_2R_3} \right] \quad (4)$$

Where $E_c$ is the maximum synchro error due to load imbalance, $\beta_c$ is the computed phase angle of synchro error due to load imbalance, $\beta_M$ is the measured phase angle of synchro error, $\delta$ is the synchro error in angular position read out and Z is the self impedance of a winding ($Z_{SS}$) plus mutual impedance ($Z_{SM}$).

As shown in the above equations, a second harmonic error is induced when the load across a synchro is unbalanced. A formula for computing the second harmonic component of error ($E_{2nd}$) from synchro accuracy test data was developed. A Fourier analysis technique was used in which error data from 12 equally-spaced test positions is required.

In the embodiment illustrated herein, the twelve equally-spaced test positions were at 30° increments starting at 0°. However, it will be realized that a greater or smaller number of test points can be used and that the test points need not be at the locations used herein. In general, any method of measurement which will permit finding the maximum synchro error and its phase can be used.

The equation which was derived is as follows:

$$E_{2nd} = \frac{\sqrt{3}}{6}(E_{30}' + E_{60}' - E_{120}' - E_{150}')\,\mathrm{SIN}2\theta + \frac{1}{6}(2E_o' + E_{30}' - E_{60}' - 2E_{90}' - E_{120}' + E_{150}')\,\mathrm{COS}2\theta \qquad (5)$$

can also be expressed as:

$$E_{2nd} = E_m\,\mathrm{SIN}\,(2\theta - \beta_m) \qquad (6)$$

where $E_m$ is the measured maximum synchro error. Where due to the 180° symmetry of the second harmonic, the quantities $E'_o$–$E'_{150}$ are obtained as follows:

$$E_{o,180} = \frac{E_o + E_{180}}{2} \qquad \text{(B-1)}$$

$$E_{30,210} = \frac{E_{30} + E_{210}}{2} \qquad \text{(B-2)}$$

$$E_{60,240} = \frac{E_{30} + E_{210}}{2} \qquad \text{(B-3)}$$

$$E_{90,270} = \frac{E_{90} + E_{270}}{2} \qquad \text{(B-4)}$$

$$E_{120,300} = \frac{E_{120} + E_{300}}{2} \qquad \text{(B-5)}$$

$$E_{150,330} = \frac{E_{150} + E_{330}}{2} \qquad \text{(B-6)}$$

$$E_{AVG} = \frac{E_{o,180} + E_{30,210} + E_{60,240} + E_{90,270} + E_{120,300} + E_{150,330}}{6} \qquad \text{(B-7)}$$

$$E_o' = E_{0,180} - E_{avg} \qquad \text{(B-8)}$$

$$E_{30}' = E_{30,210} - E_{avg} \qquad \text{(B-9)}$$

$$E_{60}' = E_{60,240} - E_{avg} \qquad \text{(B-10)}$$

$$E_{90}' = E_{90,270} - E_{avg} \qquad \text{(B-11)}$$

$$E_{120}' = E_{120,300} - E_{avg} \qquad \text{(B-12)}$$

$$E_{150}' = E_{150,330} - E_{avg} \qquad \text{(B-13)}$$

Where $E_o$–$E_{330}$ are the measured synchro errors at the indicated angles.

Where:

$$E_m = \frac{1}{6}\sqrt{[\sqrt{3}\;E_{30}' + E_{60}' - E_{120}' - E_{150}']^2 + [2E_o + E_{30}' - E_{60}'2E_{90}' - E_{120}'E_{150}']^2} \qquad (7)$$

$$\beta_m = T_{an}^{-1}\left[\frac{(2E_o' + E_{30}' - E_{60}' - E_{120}' - E_{150}')}{\sqrt{3}\,(E_{30}' + E_{60}' - E_{120}' - E_{150}')}\right] \qquad (8)$$

Figure 2:
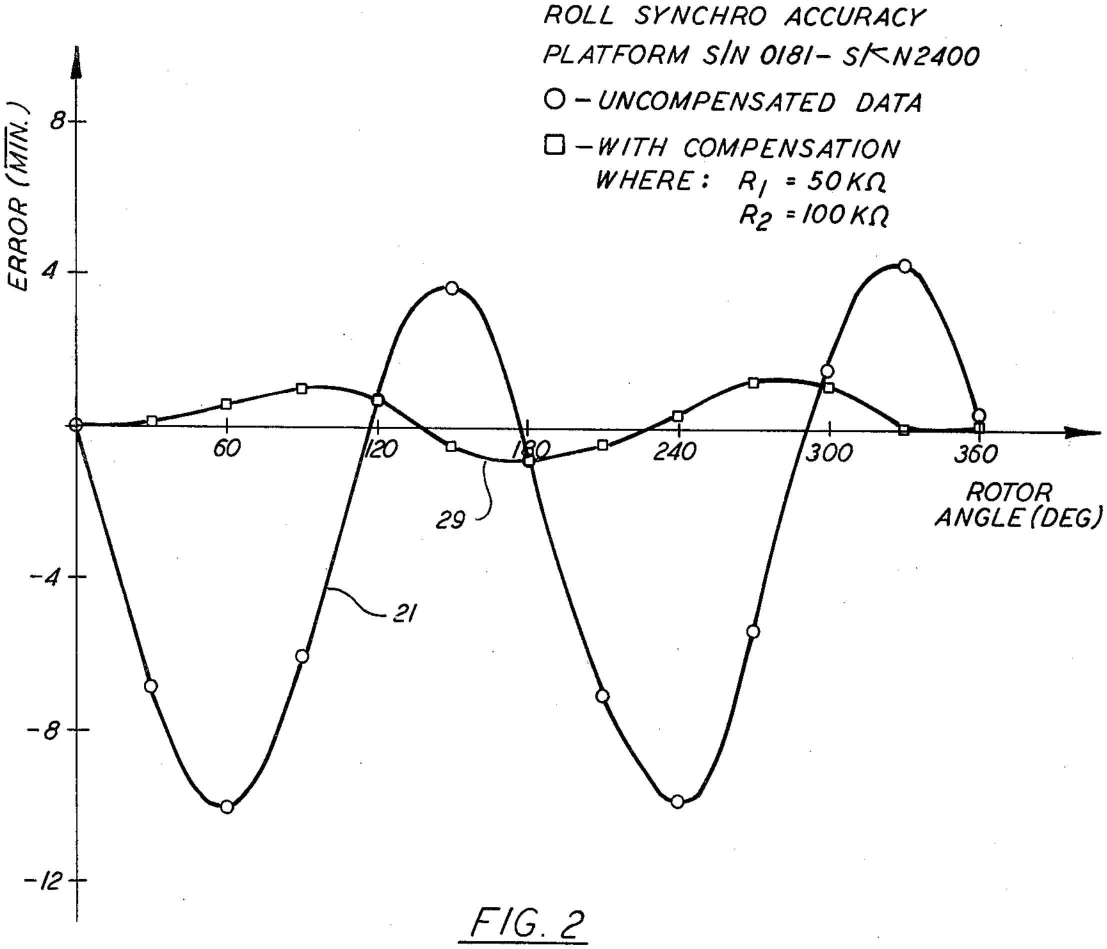
FIGS. 2 through 5 are curves illustrating the results of synchro error compensation performed according to the present invention.
Figure 3:
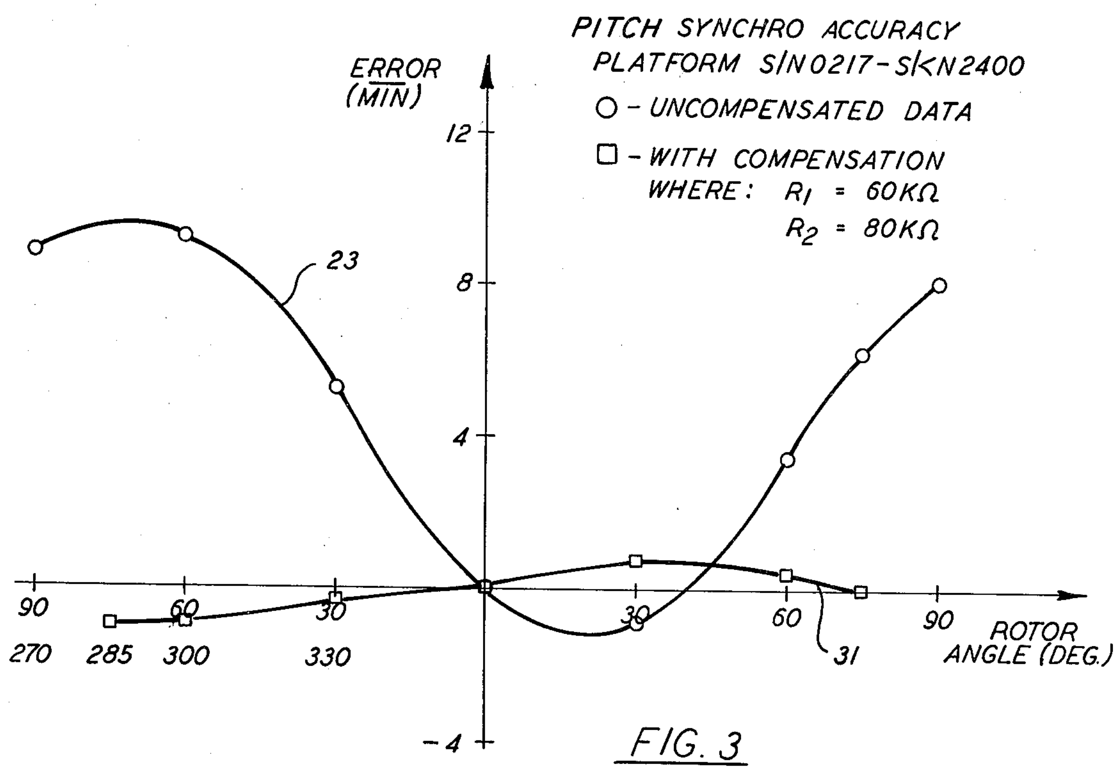
Figure 4:
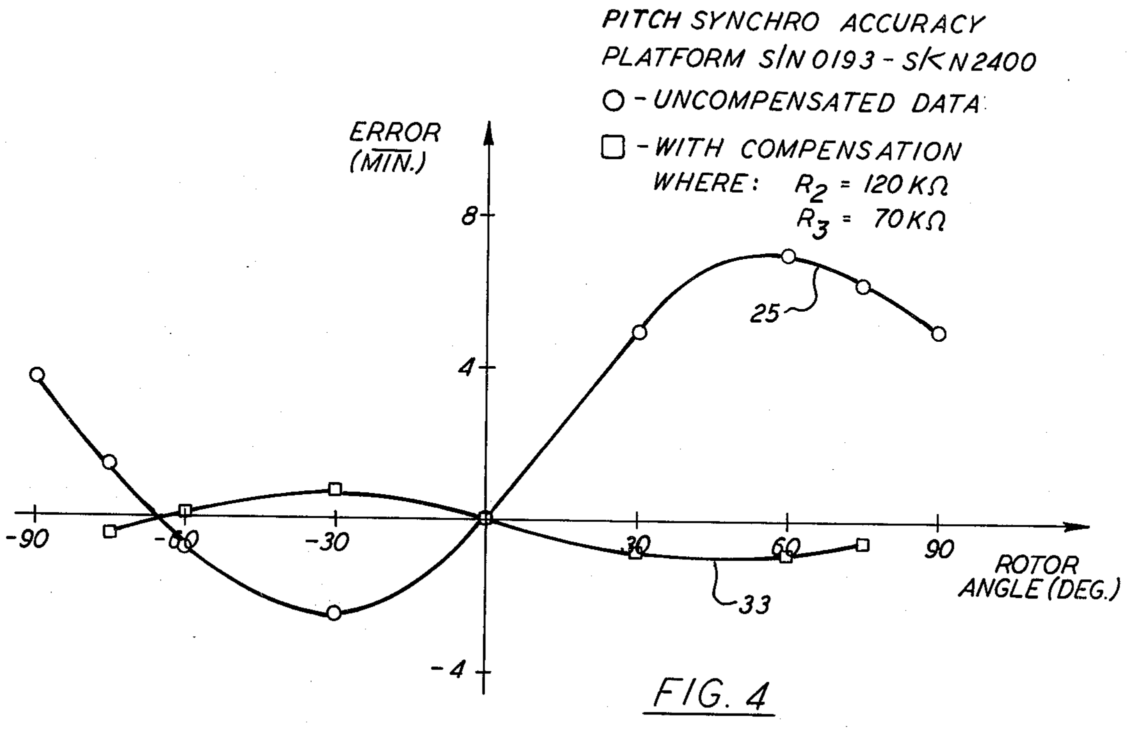
Figure 5:
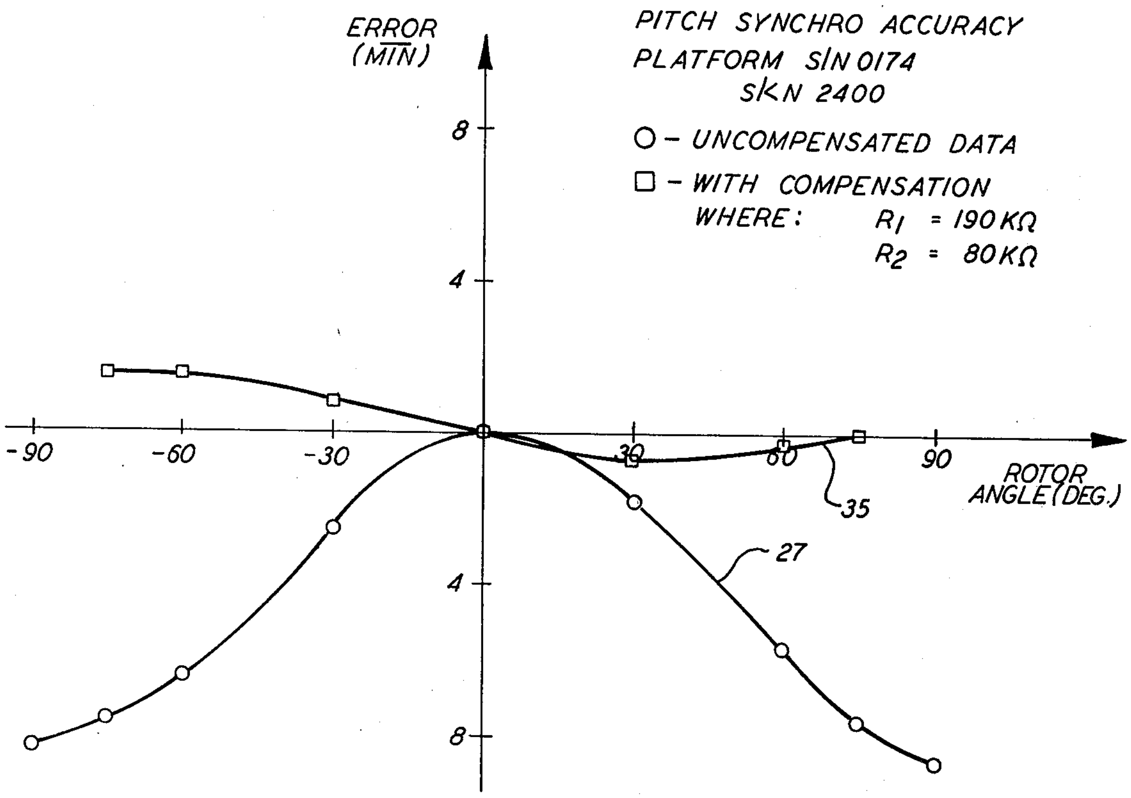

At this point, reference to FIGS. 2–5 might be helpful. FIG. 2 shows a particular synchro, a roll synchro, which has an uncompensated error designated by the curve 21. FIGS. 3–5 illustrate pitch synchros on a number of gyroplatforms which have uncompensated error curves 23, 25 and 27, respectively. These figures show that although it is convenient to use equations 5–8 to determine the maximum error and its phase angle, the same information can be obtained by plotting the data. In the case of FIG. 2, maximum errors occur at 60° and 240°. In the case of FIG. 3, the maximum error is approximately at 75°, and in FIG. 4, it is at approximately +60°. The maximum error in the synchro of FIG. 5 occurs at ±90°. These figures also show the variation in error from synchro to synchro. On the charts of FIGS. 3, 4 and 5, the error is only plotted between ±90° since the pitch synchro only operates over that range.

A study of equation (1) indicates that a second harmonic synchro error can be generated with only two resistors. Rewriting equation (1) in terms of two resistors placed in parallel with the synchro load yields:

Using $R_2$ and $R_3$ only, $R_1 = \alpha$ $$\delta = \frac{Z}{2}\left[\left(\frac{R_2 + R_3}{R_2R_3}\right)\mathrm{SIN}2\theta - \sqrt{3}\left(\frac{R_2 - R_3}{R_2R_3}\right)\mathrm{COS}2\theta\right] \qquad (9)$$

Using $R_1$ and $R_3$ only, $R_2 = \alpha$ $$\delta = \frac{Z}{2}\left[\left(\frac{R_1 + 2R_3}{R_1R_3}\right)\mathrm{SIN}2\theta - \sqrt{3}\left(\frac{1}{R_3}\right)\mathrm{COS}2\theta\right] \qquad (10)$$

Using $R_1$ and $R_2$ only, $R_3 = \infty$ $$\delta = \frac{Z}{2}\left[\left(\frac{R_1 + 2R_2}{R_1R_2}\right)\mathrm{SIN}2\theta - \sqrt{3}\left(\frac{1}{R_2}\right)\mathrm{COS}2\theta\right] \qquad (11)$$

Where δ is the synchro error in angular position readout.

From equation (3) it can be determined that for positive resistor values:

A. Equation (9) is valid for $\beta_c$=300° to 60°.
B. Equation (10) is valid for $\beta_c$=180° to 300°.
C. Equation (11) is valid for $\beta_c$=60° to 180°.

If equation (5) is equated to the negative of equations (9), (10), and (11), the values for trim resistors to compensate for the second harmonic portion of synchro error are obtained. These formulas are as follows:

For $\beta_c$=300° to 60°

For $\beta_c$ =0 300° to 60°

$$R^2 = \frac{-K}{(E_o' + 2E_{30}' + E_{60}' - E_{90}' - 2E_{120}' - E_{150}')} \qquad (12)$$

$$R_3 = \frac{K}{(E_o' - E_{30}' - 2E_{60}' - E_{90}' + E_{120}' + E_{150}')} \qquad (13)$$

For $\beta_c$ = 180° to 300°

$$R^1 = \frac{K}{(E_o' + 2E_{30}' + E_{60}' - E_{90}' - 2E_{120}' - E_{150}')} \qquad (14)$$

$$R^3 = \frac{K}{(2E_o' + E_{30}' - E_{60}' - 2E_{90}' - E_{120}' + E_{150}')} \qquad (15)$$

For $\beta_c$ = 60° to 180°

$$R^1 = \frac{-K}{(E_o' + E_{30}' - 2E_{60}' - E_{90}' + E_{120}' + E_{150}')} \qquad (16)$$

$$R^2 = \frac{-K}{(2E_o' + E_{30}' - E_{60}' - 2E_{90}' - E_{120}' + E_{150}')} \qquad (17)$$

The formulas for computation of the compensation resistor values, equations (12) through (17) contain the term K which is designated the "Synchro Constant." Its value is dependent on the self and mutual impedances of the unit being compensated. The value of this constant can be determined for a particular synchro design by testing a unit and obtaining data for utilization with the formula developed below.

Equation 11 can be rewritten for $R_1=R_3=\alpha$ as follows:

$$\delta = \frac{Z}{R_2}\ \text{SIN}\ (2\theta + 60°) \tag{18}$$

At $\theta = 0°$ $$\delta = \frac{3\sqrt{3} \times Z}{6R_2} \tag{19}$$

Since $K=3\sqrt{3}\times Z$ $$K=6R_2\delta \tag{20}$$

Synchro error can also be expressed as a function of in phase null voltage as follows:

$$\delta = \frac{E_{null}}{K_{SF}} \tag{21}$$

Where $K_{SF}$ is the synchro scale factor.

Equations 20 and 21 indicate that the Synchro Constant K can be determined by adding $R_2$ across the synchro load, and measuring the corresponding null change with the rotor at $\theta=0°$.

The formula for the direct measurement of K is:

$$K = \frac{6[(R_2)(\Delta E'_{null'})]}{K_{SF}} \tag{22}$$

where $\Delta E'_{null}$ null is the change in synchro null associated with the addition of $R_2$ to the synchro circuit. Since synchro error test data is usually measured in arc minutes, K can be expressed in ohm-arc minutes for ease of utilization.

Once the necessary resistor values are determined in accordance with the above, the resistors are placed across the required synchro outputs. The resistors may either be built into the synchro transmitter or, if the synchro transmitter is being supplied with other hardware to which the outputs are connected may be included on appropriate printed circuit boards in that hardware.

TEST RESULTS

The deterministic synchro error compensation technique described above was applied to production gyro platforms. Raw synchro test data was used to compute compensation resistor values and their locations at the synchro output terminals. For the pitch synchro whose freedom is limited, it was assumed that the error outside the limitation angles was a repeat of the measured data within the range of angular freedom. This yields proper error compensation in the useable pitch angular range.

Before compensation could be attempted, the Synchro Constant K was measured as outlined above. Data taken on three platforms indicated that this constant was consistent between the units tested and was measured to be $K=1.959\times10^{-6}$ ohm-min.

FIGS. 2 through 5 display the results of synchro error compensation performed on SKN 2400 roll and pitch axis sychros manufactured by The Kearfott Division of the Singer Company. These figures show both the uncompensated error (curves 21, 23, 25 and 27) and compensated residual error (curves 29, 31, 33 and 35). As indicated by the reductions in errors, the compensation technique presented is effective.

What is claimed is:

1. A method of correcting errors in synchro control transmitters having a stator with outputs S1, S2 and S3 comprising:

(a) measuring the error in the synchro transmitter at equal angular increments;

(b) determining the magnitude and phase of the maximum error of the second harmonic;

(c) placing across two pairs of the outputs S1, S2 and S3 resistors such as to establish a second harmonic load unbalance which is approximately equal in magnitude and opposite in phase to the measured error.

2. The method according to claim 1 wherein when the maximum error is between 360° and 60°, resistors are placed across the terminals S2 and S3 and S1 and S2, when the maximum error is between 180° and 300° resistors are placed across the output terminals S1 and S3 and S1 and S2, and when the maximum error is between 60° and 180° resistors are placed across the terminals S1 and S3 and S3 and S2.

3. The method according to claim 1 and further including the step of determining the value of said resistors to be placed across said outputs as a function of the synchro constant and further including the step of determining the synchro constant of the synchro to be corrected.

4. The method according to claim 3 wherein said synchro constant is determined by placing a resistor across the terminals S2 and S3 and measuring the change in null voltage with said resistor placed thereacross and multiplying the null voltage by the value of the resistor and the factor 6 divided by the synchro scale factor.

5. A compensated synchro transmitter comprising a synchro transmitter having a rotor winding and three Y-connected stator windings having outputs S1, S2 and S3 and first and second resistors across two selected pairs of said terminals, said resistors having values such that when placed across said selected pairs of said terminals such that they generate an unbalanced second harmonic load error which has a phase and magnitude approximately opposite to the second harmonic error in said synchro, thereby correcting said second harmonic error to improve the accuracy of said synchro.

6. The apparatus according to claim 5 wherein said maximum synchro error is a phase angle between 180° and 300° and said resistors are across the terminals S1 and S3 and S1 and S2.

7. The apparatus according to claim 5 wherein said maximum synchro error is a phase angle between 300° to 60° and said resistors are across the terminals S3 and S2 and S1 and S2.

8. The apparatus according to claim 5 wherein said maximum synchro error is a phase angle between 60° to 180° and said resistors are across the terminals S1 and S3 and S3 and S2.

* * * * *